United States Patent [19]

Tarrant

[11] 4,126,064
[45] Nov. 21, 1978

[54] PREPARATION OF ANNULAR BLANKS FROM TUBE STOCK

[75] Inventor: Brian D. Tarrant, Gloucester, England

[73] Assignee: Formflo Limited, Cheltenham, England

[21] Appl. No.: 806,895

[22] Filed: Jun. 15, 1977

[30] Foreign Application Priority Data

Jun. 15, 1976 [GB] United Kingdom ............... 24819/76

[51] Int. Cl.² .................... B23B 3/00; B23B 1/00; B23B 3/04; B21B 13/20
[52] U.S. Cl. .................................... 82/1 C; 82/47; 82/92; 82/2 R; 72/70; 29/148.4 R
[58] Field of Search ............... 82/1 C, 47, 92; 72/70, 72/338; 29/148.4, 149.5, 417, 558, 527.6

[56] References Cited

U.S. PATENT DOCUMENTS

| | | | |
|---|---|---|---|
| 2,070,582 | 2/1937 | Bannerman | 72/70 |
| 3,470,775 | 10/1969 | Marocovich | 82/47 |
| 3,563,119 | 2/1971 | Shashaty | 82/47 |
| 3,927,450 | 12/1975 | Sommer et al. | 29/148.4 R |

Primary Examiner—Harrison L. Hinson
Attorney, Agent, or Firm—Pollock, Vande Sande & Priddy

[57] ABSTRACT

A method and machine for preparing an annular workpiece from tube stock, using a part-off rolling tool. The rolling tool is advanced radially of the tube stock to a depth approximately equal to the desired bore diameter of the workpiece so as to partially sever a length from the tube stock. The inside of the length is then machined to the desired bore diameter. The machining either causes the length to be fully severed from the rest of the tube stock or leaves it connected thereto by a thin annular band. In the latter case the rolling tool is then advanced further to fully sever the length from the rest of the tube stock.

11 Claims, 8 Drawing Figures

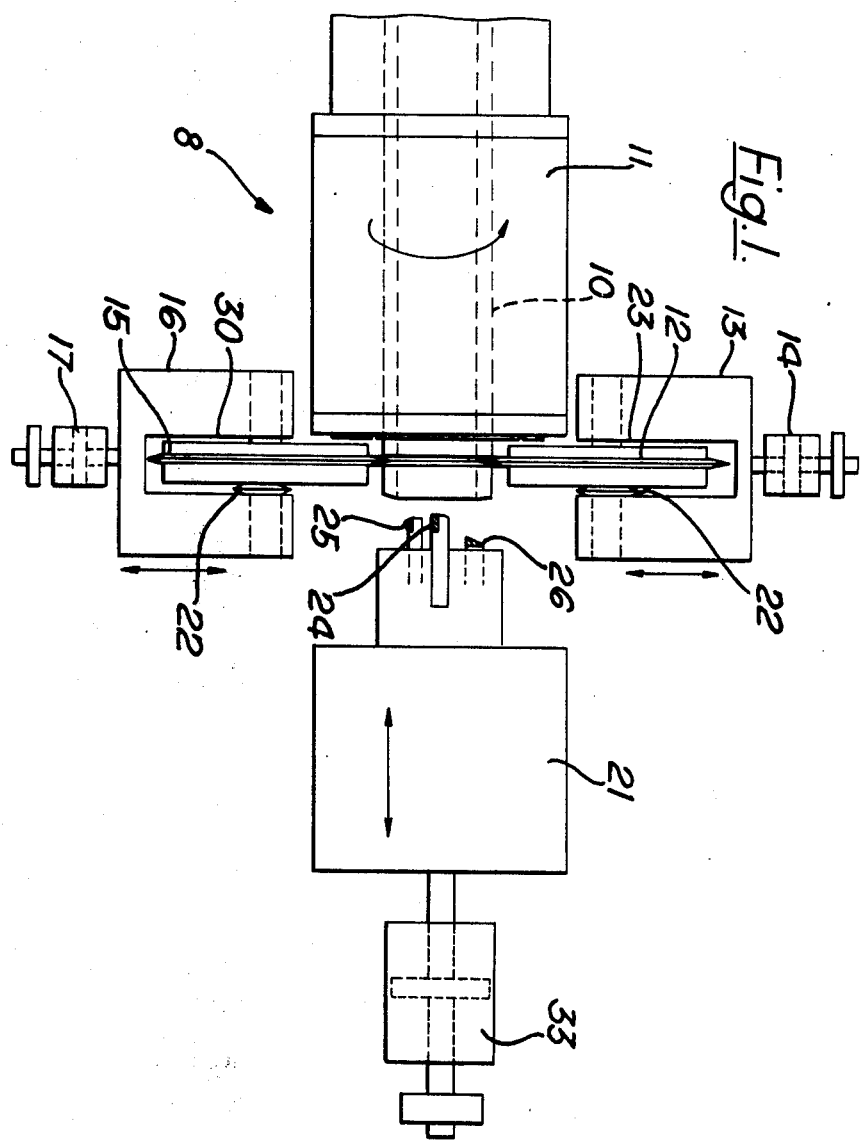

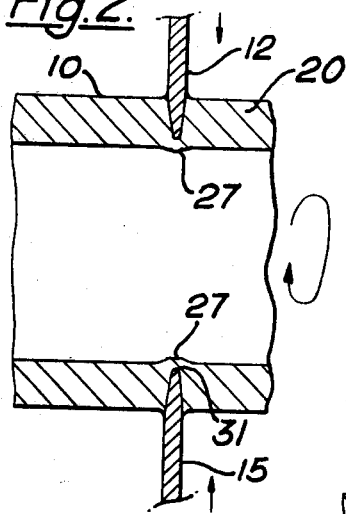
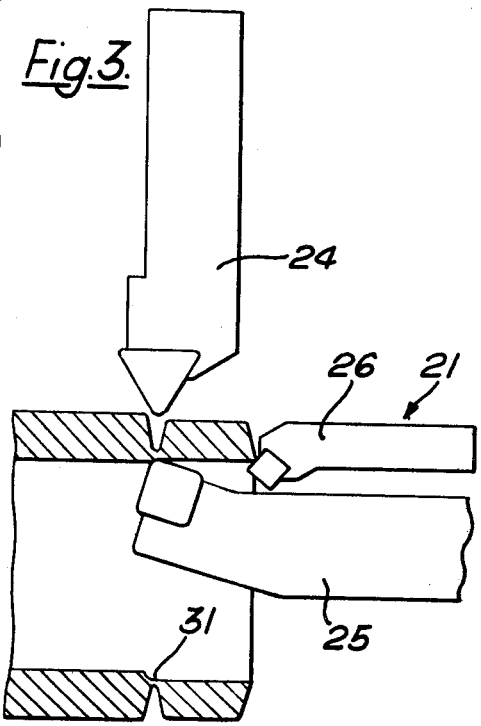
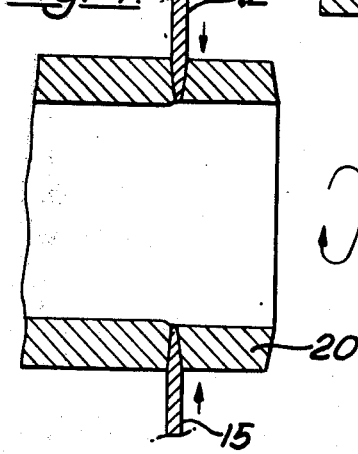

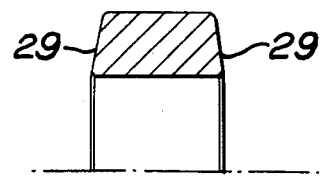
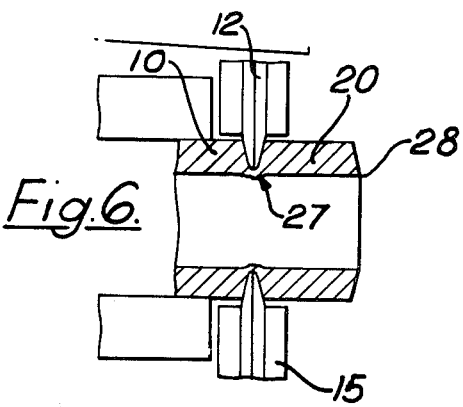
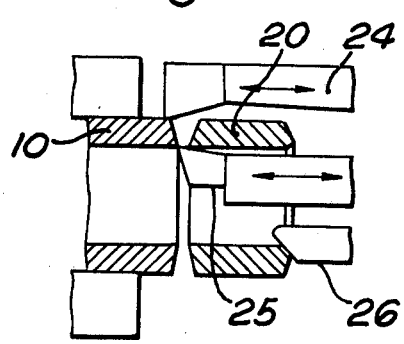
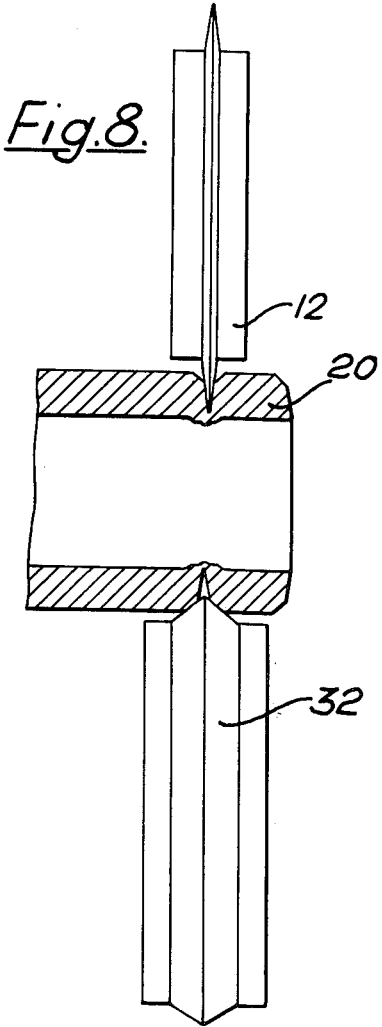

PREPARATION OF ANNULAR BLANKS FROM TUBE STOCK

This invention relates to the preparation of annular metal workpieces from tube stock to provide workpieces suitable, for example, for shaping by ring rolling by processes such as described in U.K. Pat. Nos. 1,329,251; 1,378,508; 1,384,387; 1,384,388; and 1,395,726, and copending U.K. Patent Application Nos. 32783/74; 32784/74; 32785/74 and 32786/74, corresponding to U.S. Pat. Nos. 3,803,890; 3,839,892; 3,855,833; 3,992,911; 3,992,910; 3,992,914; and 3,992,929.

There are automatic machines available on which such blanks can be produced. Possibly the most suitable is the multispindle lathe. The multispindle lathe however was originally designed to produce more complex components than simple annular rings and consequently is a more complicated machine than that necessary to produce such workpieces. Other disadvantages of such a lathe are the high capital cost, the lack of rigidity and the low spindle speeds preventing the use of high speed turning with carbide tooling, resulting in lower production rates. A major disadvantage, however, of any machining operation in relation to the manufacture of annular workpieces from tube is the material loss created by the conventional parting-off blade. For example, in the manufacture of bearing races, 15 to 20% of the very expensive tube material can be lost in the form of swarf due to this part-off blade.

It is therefore an object of the invention to reduce this waste.

According to the invention there is provided a method of preparing annular workpieces from tube stock in which the tube stock is subjected to a part-off rolling step, the part-off rolling tool being advanced to a depth approximately corresponding to the final machined bore diameter of the workpiece but being stopped before a length is severed from the tube stock, and thereafter the inside of the partially severed length of the tube is machined to the desired inside diameter of the workpiece. Depending on the depth to which the rolling tool is advanced, this maching will either separate the workpiece from the tube stock, or leave it connected thereto by a thin annular band. In the latter case, after retraction of the boring and turning tools, the rolling tool is then advanced a further amount, thereby separating the workpiece from the tube stock.

It is an advantage of this method that, during the part-off rolling step, the roll-parting tool displaces metal, which would normally be lost in a conventional part-off operation, in an axial direction thereby achieving a considerable material saving. It is necessary to machine the inside surface or bore of the workpieces to an accurate size and so any metal lost at that stage is no more than would be lost in a conventional turning operation.

The part-off rolling step and the bore machining of the partially severed tube can be performed on separate machines. Preferably, however, they are performed on a single machine which forms another aspect of the invention and which comprises a rotable chuck for supporting the tube stock, a rotable part-off rolling tool capable of being urged in a direction radially of the tube towards the tube, so as partially to sever a length of tube and a boring tool capable of being advanced in a direction parallel to the axis of the tube to machine the inside bore of the tube. Preferably, the rolling tool is capable of being urged radially in two separate movements. The first movement partially severs the workpiece, before the machining occurs, and the second movement finally severing the workpiece.

A backing roll may be mounted radially opposite the rolling tool, but in a preferred embodiment two rolling tools are used, one mounted on the opposite side of the tube from the other.

Each rolling tool is preferably mounted on a shaft which is rotably mounted in a yoke assembly, the assembly being slidably mounted radially of the tube. A hydraulic cylinder is attached to each of the yokes to provide the infeed movement and the rolling force. The rolling tools must have some axial freedom of movement to follow the displacement of metal which occurs during the part-off rolling step.

While there are available some machines which employ the roll part-off technique they sever a workpiece s to be roll-formed. According to this invention, however, the rolling tool is permitted only to separate the workpiece partially during the first operation and the final separation is caused either by the machining of the bore, or by the second operation of the rolling tool which must occur after the boring operation. We find that this method considerably reduces the burr such that only a simple light deburring operation is required to produce an acceptable workpiece.

Prior to severing the workpiece, the bore and preferably the outside diameter are machined accurately and the front of the ring may be also chamfered or deburred simultaneously. This can be achieved by mounting the outside diameter machining tool and boring tool on the same head. Further, a chamfering tool may be carried by the same head. These additional operations are desirable to improve the diametral tolerance of the tube, to remove any eccentricity (bore to outside diameter) and to remove the decarburised layer present on most tubes. The blanks or workpieces produced by this process have a cross sectional shape which is ideal for the subsequent ring rolling process described in the Patents and Patent applications mentioned above. The angled side faces of the workpieces and the slight increase in surface hardness of these faces caused by the roll parting tool in such workpieces enables a better face condition to be achieved by the subsequent ring rolling process.

The invention will now be described, by way of example, with reference to the accompanying diagrammatic drawings, in which:

FIG. 1 is a plan view of one embodiment of a machine for preparing workpieces in accordance with the invention;

FIG. 2 shows the partially roll-parted ring;

FIG. 3 shows the boring, turning and chamfering operations using an alternative embodiment of a machine head;

FIG. 4 shows the finally severed ring;

FIG. 5 shows a half section of a roll parted ring.

FIG. 6 shows an alternative method of preparing workpieces;

FIG. 7 shows the turning operation for the alternative method;

FIG. 8 shows an alternative embodiment of part of the machine of FIG. 1.

The annular blank preparing machine 8 shown in FIG. 1 has a conventional collect chuck assembly 11 driven by conventional means. The chuck assembly 11 holds a length of tube 10, e.g. steel tube, to be severed into separate workpieces. Non-driven rolling tools 12 and 15 are rotably mounted in yokes 13 and 16 respectively, which in turn are forced by hydraulic cylinders 14 and 17 towards the tube 10 during the parting operation. Both cylinders 14 and 17 operate to advance the tools 12 and 15 simultaneously until they reach a predetermined depth. At this point the part-off gap is as shown in FIG. 2. Once the cylinders 14 and 17 have reach this position they are locked in the position by conventional hydraulic means.

During the advance of the tools 12 and 15, they progressively bite into the metal of the tube and part a length to form a ring blank 20 from the rest of the tube; there is no waste of metal as in a cutting step. The tools 12 and 15 are advanced, as seen best in FIG. 2, to a point approximately 0.015 inch from the machined bore, leaving an annular bulge 27 and a thin annular band 31 (see FIG. 3) which attach the blank 20 to the tube 10.

During the roll-parting operation and because the metal is being displaced, a partially severed ring blank 20 moves in an axial direction towards a machining head 21 (see FIG. 1). Due to this, the rolling tools 12 and 15 are also able to move in the same direction against disc springs 22 which collapse as the tools move to the right in FIG. 1. These disc springs 22 do, however, hold the tools 12 and 15 against fixed faces 23 and 30, respectively, at the start of a roll-parting operation to ensure a constant datum position at the commencement of each roll-parting operation.

With the tools 12 and 15 held at the position shown in FIG. 2, the machining head 21 is then moved towards the tube by hydraulic cylinder 33. The head 21 (see FIG. 1) carries a cutting tool 24 to machine the outside diameter of the ring, a boring tool 25 to machine the bore of the ring and also a chamfering tool 26. An alternative embodiment of the head 21 is shown in FIG. 3. The boring tool 25 machines the ring's bore to the required diameter and removes the annular bulge 27, thereby leaving the ring 20 connected to the tube 10 only by the annular band 31.

After machining, head 21 is retracted and rolls 12 and 15 are further advanced to their final position shown in FIG. 4 thereby severing the ring 20 from tube 10.

The finished blank 20 is shown in FIG. 5. This method of preparation produces an ideal blank shape for a subsequent ring rolling process since the angled side faces 29 promote better metal flow than in blanks having rectangular cross-section. The blank also has accurate inside and outside diameters.

An alternative method to that described above, and one that becomes particularly applicable where excess turning stock is permissible in the bore of the tube or where solid bar is being considered, is to advance roll tools 12 and 15 to their final position, corresponding to the internal diameter of the ring 20, in one movement, as seen in FIG. 6. Because of the annular bulge 27 formed by the tools, it is possible to do this without severing the ring 20. The rolling tools 12 and 15 are then fully retracted and machining head 21 is advanced to carry out the boring, turning and chamfering operations, causing boring tool 25 to sever the ring 20 from tube 10 as shown in FIG. 7. In this method the head 21 is preferably as shown in FIG. 1, wherein the outside turning tool 24 is set slightly in advance of the boring tool 25 and the chamfering tool 26 is set to cut the necessary chamfer just prior to the boring tool severing the ring.

A further alternative method is where only one rolling tool is employed and in this case either the two-stage or one-stage advancement of the rolling tool can be employed.

In this instance a back up roll 32, shown in FIG. 8, replaces the rolling tool 15 and is used to oppose the radial forces created by rolling tool 12. The back up roll can also be shaped to achieve, for example, chamfers or radii on the outside diameter of the workpiece formed by the ring blank 20.

I claim:

1. A method of preparing an annular workpiece from tube stock comprising advancing a part-off rolling tool radially of the tube stock to a depth approximately corresponding to the final desired bore diameter of the workpiece but stopping the tool before a length is fully severed from the tube stock, and thereafter machining the inside of the partially severed length to the desired bore diameter.

2. A method as claimed in claim 1 wherein the rolling tool is advanced to such a depth that the machining severs the length from the rest of the tube stock.

3. A method as claimed in claim 1 further comprising advancing a second rolling tool radially of the tube stock and simultaneously with the said rolling tool partially to sever the length of tube stock.

4. A method as claimed in claim 1 further comprising advancing a back up roll radially of the tube stock and simultaneously with the rolling tool to chamfer the outside diameter of the inner end of the length of tube stock while partially severing the length.

5. A method as claimed in claim 1 further comprising machining the outside diameter of the length of tube stock while machining the inside diameter thereof.

6. A method as claimed in claim 1 further comprising chamfering the outer end of the length of tube stock while machining the inside diameter thereof.

7. A method of preparing an annular workpiece from tube stock comprising advancing a part-off rolling tool radially of the tube stock to a depth slightly less than that of the final desired bore diameter of the workpiece, and thereafter machining the inside of the partially severed length thus formed to the desired bore diameter, and then further advancing the rolling tool fully to sever the length from the rest of the tube stock.

8. A method as claimed in claim 7 further comprising advancing a second rolling tool radially of the tube stock and simultaneously with the said rolling tool partially and fully to sever the length of tube stock.

9. A method as claimed in claim 7 further comprising advancing a back up rolling tool radially of the tube stock and simultaneously with the rolling tool to chamfer the outside diameter of the inner end of the length of tube stock while partially severing the length.

10. A method as claimed in claim 7 further comprising machining the outside diameter of the length of the tube stock while machining the inside diameter thereof.

11. A method as claimed in claim 7 further comprising chamfering the outer end of the length of tube stock while machining the inner diameter thereof.

* * * * *